(12) United States Patent
Hagiwara et al.

(10) Patent No.: US 6,358,554 B1
(45) Date of Patent: Mar. 19, 2002

(54) PROCESS FOR PRODUCING POWDERY ACID-TREATED EGG

(75) Inventors: Yoshihide Hagiwara, 4-14, Hiraisanso, Takarazuka-shi, Hyogo 665-0817 (JP); Hideaki Hagiwara, Takarazuka (JP)

(73) Assignee: Yoshihide Hagiwara, Hyogo (JP)

( * ) Notice: Subject to any disclaimer, the term of this patent is extended or adjusted under 35 U.S.C. 154(b) by 0 days.

(21) Appl. No.: 09/554,889

(22) PCT Filed: Sep. 17, 1999

(86) PCT No.: PCT/JP99/05068

§ 371 Date: May 22, 2000

§ 102(e) Date: May 22, 2000

(87) PCT Pub. No.: WO00/18257

PCT Pub. Date: Apr. 6, 2000

(30) Foreign Application Priority Data

Sep. 25, 1998 (JP) ............................................. 10-287353
Apr. 21, 1999 (JP) ............................................. 11-113712

(51) Int. Cl.[7] ................................ A23L 1/32; A23J 3/00
(52) U.S. Cl. ........................ 426/614; 426/47; 426/330.1
(58) Field of Search ...................... 426/614, 47, 330.1, 426/298

(56) References Cited

FOREIGN PATENT DOCUMENTS

| JP | 5533 | 1/1980 |
|----|------|--------|
| JP | 58047468 | 3/1983 |
| JP | 58170429 | 10/1983 |
| JP | 59196069 | 11/1984 |
| JP | 61158764 | 7/1986 |
| JP | 61185168 | 8/1986 |
| JP | 61234758 | 10/1986 |
| JP | 62175155 | 7/1987 |
| JP | 07163315 | 6/1995 |
| JP | 08038107 | 2/1996 |
| JP | 08080174 | 3/1996 |
| JP | 08080175 | 3/1996 |
| JP | 08214834 | 8/1996 |

OTHER PUBLICATIONS

Database Abstract. Derwent Acc. No. 1998–000246 for CN 1130997. Inventor: Wang. Date published: Sep. 18, 1996.*

* cited by examiner

*Primary Examiner*—Anthony J. Weier

(57) ABSTRACT

According to the present invention, production processes for pickled egg powder which includes either adding an aqueous solution of edible acid to whole eggs (including egg shell) at a rate of at least 150 ml per 100 g of the whole eggs, effecting the pickling treatment at temperatures of from about 0° to about 50° C., optionally filtering the so formed pickled egg solution and spray-drying the same under the conditions of an inlet temperature of at least 180° C. and an outlet temperature of at least 120° C.; or adding an aqueous solution of edible acid and hydrolytic enzyme to whole eggs (including a egg shell), carrying out the decomposition treatment at temperatures of from about 0° to about 50° C., optionally heat-sterilizing and/or filtering the so formed liquid decomposition product, and powderizing the same by drying, are provided.

23 Claims, No Drawings

PROCESS FOR PRODUCING POWDERY ACID-TREATED EGG

TECHNICAL FIELD

This invention relates to a novel process for making pickled egg powder. More particularly, it relates to a process for making fragrant pickled egg powder which is rich in taste and has very little vinegary smell, and also to a process for making pickled egg powder excelling in digestibility and seldom inducing allergy to egg.

BACKGROUND ART

Conventionally, pickled egg is prepared by adding vinegar to raw, whole eggs, followed by 5 to 10 days' pickling, and then served as food without any further processing. Whereas, not only many hours are required for its preparation, but also the pickled egg so formed has unfavorable taste and is unpalatable, impossible of preservation over a prolonged period and its servable time is limited. That is, heretofore practiced process comprises pouring vinegar into a container containing whole eggs, allowing the eggs to remain immersed in the vinegar for 5–10 days at room temperature to dissolve the egg shell in the vinegar and blending the solution containing the egg shell in the form of calcium and other mineral salts of acid together with the egg white and yolk in a mixer. The whole egg solution is served as health-maintaining drink in an amount of 10–20 ml per dose. Whereas, solubilized calcium and other minerals such as magnesium, potassium, aluminum, manganese, iron, selenium, zinc and the like in the form of acid salts are very bitter and furthermore acrid to the taste, and the solution is extremely unpalatable, in combination with the sour taste of the acid. Furthermore, the solution is occasionally liable to putrefy when kept for long, e.g., one to two months. Again, the pickled egg solution as formed contains various germs, but its sterilization by heating causes its coagulation (protein coagulation) and renders it unsuitable for a drink.

Pickled egg has been utilized as health food of old and various pickled egg-derived foods in which the above defects are improved, as well as their production processes, have been proposed in the past. Such proposals include, for example, pickled egg-derived food made by immersing raw eggs in citric acid or malic acid solution and after the egg shell is dissolved, stirring and mixing it with the egg white and yolk (JP Sho 55 (1980)-33B1); pickled egg prepared by dissolving egg shell in edible vinegar, adding white sesame seeds to the acid solution at a ratio of egg yolk cholesterol: linoleic acid=1:2 and mixing the same with a liquid of egg white and egg yolk (JP Sho 15 61 (1986)-158764A1); pickled egg-containing food in which the weight ratio of phosphorus to calcium is at least 2 (JP Sho 61 (1986)-234758A1); dissolving dry egg shell powder in edible vinegar and other organic acid solution, filtering, and mixing the filtrate with a solution of egg white and yolk (JP Sho 63 (1988)-45793B1); a process for making solid pickled egg by mixing dry egg white, dry egg yolk and egg shell powder with powder vinegar, organic acid and food seasonings (JP Sho 63 (1988)-47438B1); a pickled egg-like nourishing food which is made by dissolving egg shell powder in edible vinegar or an organic acid solution and drying the same to powder form (JP 25 Sho 61 (1986)-185168A1); a nourishing food and a process for making the same, comprising preparing pickled egg by immersing whole eggs or egg shell of birds in vinegar solution, on which occasion adding to the immersion system ascorbic acid and β-carotene-containing foodstuff, adsorbing them onto maltose and freeze-drying the same (JP 30 Hei 8 (1996)-38107 A1); pickled egg, jelly containing ascorbic acid (JP Hei 8 (1996)-8017.iA1); pickled egg; jelly containing Ukkokei (Gallas gallus dometicus Brisson) extract (JP Hei 8 (1996)-80175A1); pickled egg food blend with dried mushrooms, parched soybean, dried sea tangle, Enmeisō (Isodon Japonicus Hara), parched sesame seed, parched rice bran, Japanese persimmon leaves, etc. (JP Hei (1996)-214834A1) and defatted pickled egg power (JP 2707511) among others.

Those pickled egg-processed foods and their production processes heretofore disclosed did modify pickled egg-production steps, but the products invariably exhibit insufficient digestibility, are too strongly sour and bitter to be pleasant to palate and are liable to induce allergy to egg.

We have engaged in concentrative studies with the view to improve the bad taste of pickled eggs which were prepared by adding edible aqueous acid solutions to whole eggs, to now discover that very tasteful pickled egg powder can be obtained when a pickled egg solution which is made by adding edible aqueous acid solution to whole eggs is spray-dried under specific conditions, because excessive amount of the remaining edible acid is whereby evaporated off and removed, while the egg-constituting components are adequately roasted to emit fragrance.

We furthermore have carried out various investigations with the view to solubilize egg shells, which in their normal form have poor bioabsorbability, to a state easy of absorption as well as to improve the defects of pickled eggs which render them unsuitable for drink and to impart to all components of whole eggs inclusive of egg shell excellent bioabsorbability, and now discovered that concurrent use of enzymes capable of hydrolyzing protein, fat, carbohydrate, etc. in the occasion of solubilizing treatment of whole eggs with edible acids promotes decomposition (digestion) and solublization of whole egg components, shortens production time of pickled egg and at the same time the obtained pickled egg exhibits markedly improved digestive absorption and furthermore is inhibitory to occurrence of allergy to egg.

DISCLOSURE OF THE INVENTION

According to the first embodiment of the present invention, a process for making fragrant and tasteful pickled egg powder free of vinegary smell is provided, which comprises adding an aqueous solution of edible acid to whole eggs (including egg shell), at a rate of at least 150 ml of the solution per 100 g of the whole eggs, to pickle the eggs at temperatures of from about 0° to about 50° C., optionally filtering the resulting solution of pickled eggs, and thereafter spray-drying the same under the conditions of an inlet temperature of at least 180° C. and an outlet temperature of at least 120° C.

According to the second embodiment of the present invention, a process for making pickled egg powder is provided, which comprises adding an aqueous solution of edible acid and hydrolytic enzyme to whole eggs (including egg shell), carrying out the hydrolyzing treatment at from about 0° to about 50° C., optionally heat sterilizing and/or filtering the resultant hydrolyzate and drying the product to powder, preferably by spray-drying under the conditions of at an inlet temperature of at least 180° C. and an outlet temperature of at least 120° C.

Hereinafter the process of the present invention is explained in further details.

EMBODIMENTS OF THE INVENTION

As eggs to be used as the starting material in the process of this invention, hen's eggs (normal eggs, fertilized eggs, iodine eggs) are preferred, while eggs of other birds, for example, ducks and quails, may be similarly used. In the present invention, not only egg white and yolk but the total egg components including egg shell are used.

According to the first embodiment of the present invention, first whole eggs including egg shell are immersed in an aqueous solution of edible acid and dissolved. This dissolving treatment is conducted at temperatures ranging from about 0° C. to about 50° C., normally at room temperature and atmospheric pressure conditions, securing sufficient contact of all of the starting whole eggs with the edible aqueous acid solution. In said occasion, the system may suitably be stirred to expedite dissolution of egg shell. The immersing or pickling treatment is continued until at least the greatest part of the egg shell present is dissolved and solid shell component almost disappears, which normally requires 5–10 days.

According to the second embodiment of the present invention, the decomposition treatment of whole egg components can be conducted by adding an aqueous solution of edible acid and hydrolytic enzyme to whole eggs including egg shell. In that occasion, hydrolytic enzyme may be added to whole eggs together with the edible aqueous acid solution, or first the acid solution alone may be added to whole eggs to effect the decomposition treatment and at the stage where the egg shell is dissolved to a certain extent, for example, at a stage where the egg shell has been partially solubilized or after substantially complete dissolution of the egg shell, the solution can be optionally given a grinding treatment with, for example, a mixer, to form a ground emulsion, and a hydrolytic enzyme is added to the emulsion, followed by further decomposition treatment. It is also permissible, furthermore, to first grind whole eggs with, for example, a mixer to form a ground emulsion of whole eggs and then to add an edible aqueous acid solution and hydrolytic enzyme to the emulsion to effect its decomposition treatment.

The decomposition treatment is performed at temperatures ranging from about 0° to about 50° C., normally at room temperature and under atmospheric pressure conditions, in the manner securing full contact of the starting whole eggs with an aqueous solution of edible acid and hydrolytic enzyme. The treatment is continued until at least the greatest part of the egg shell present is dissolved and solid egg shell component substantially disappears. Preferably, it is continued for at least additional 1–2 days after the greatest part of the egg shell is dissolved.

The decomposition treatment time is freely variable depending on kind of starting eggs, their contacting conditions with the aqueous solution of edible acid, the decomposition treatment conditions, etc. Whereas, concurrent use of a hydrolytic enzyme renders it normally sufficient to pickle the eggs for 1–3 days. Thus, compared with 5–10 days' pickling required when no hydrolytic enzyme is used, the treating time can be notably shortened.

Examples of aqueous solution of edible acids useful for the present invention include those of brewed or synthesized vinegar like rice vinegar, natural rice vinegar (kurozu) and apple vinegar; and those of edible organic acids such as acetic acid, malic acid, citric acid, succinic acid and lactic acid. They can be used either singly or in combination. These aqueous solutions generally have a pH ranging from 1 to 5, preferably 2 to 4.

The use rate of the aqueous solution of edible acid is not critical, but is variable depending on its composition, contacting state with whole eggs, presence or absence of hydrolytic enzyme, etc. For example, when the main component is an organic acid such as acetic acid, generally at least 100 ml, preferably 150–500 ml, inter alia, 200–400 ml of the solution per 100 g of whole eggs is conveniently used.

As hydrolytic enzymes which may be concurrently used with such aqueous solution of edible acid, various commercial enzymatic agents which are capable of hydrolyzing protein, fat and carbohydrate, etc. can be used. Specific examples include: Kreistase (Daiwa Chemical Co., Ltd.); Biodiastase, Newlase, Lipase and Pancreatin (products of Amano Pharmaceutical Co, Ltd.); Saccharated Pepsin (Mikuni Chemical Industries Co., Ltd.); and Lecitase 10L (Novo Nordisk Bioindustry Co., Ltd.). Use rate of these enzymatic agents also is not critical, but is variable depending on the kind of starting eggs and conditions of the decomposition treatment, while it is normally convenient to use them in the range of 0.01–1 g, in particular, 0.02 to 0.5 g, per 100 g of whole eggs.

Use of such an enzymatic agent promotes decomposition of the binder component constituted of protein, polysaccharide and the like, which is present between crystals of calcium carbonate which occupies at least about 93% of egg shell and other minor inorganic components such as magnesium carbonate, calcium phosphate, etc., to expedite water-solubilization of egg shell calcium with edible acid. Furthermore, decomposition of protein, lipid and glucide in egg white and yolk is also accelerated to reduce their molecular weights, whereby markedly improving their bioabsorbability. Consequently, the resulting liquid decomposition product of whole eggs has a number of valuable merits such that it does not coagulate under a heat treatment at 60–80° C. which is necessary for sterilization, nor is it substantially denatured in the occasion of spray-drying.

The pickled egg solution or liquid decomposition product of whole eggs resulting from the above dissolution or decomposition treatment may optionally be heat-sterilized in accepted manner and/or given an enzyme-deactivating treatment and/or removed of residual solid component by filtration or like means, and then is dried to powder.

Drying and powderization of the liquid decomposition product in the second embodiment of the present invention can be carried out by any method known per se, e.g., spray-drying, freeze-drying or reduced pressure-drying, spray-drying being most convenient.

The spray-drying can be effected with an ordinary spray-drying apparatus. According to the first embodiment of the present invention, the characteristic feature of the spray-drying resides in that its operation conditions are specifically set to be at relatively high temperatures, such that the inlet temperature is at least 180° C., preferably 190–230° C., and the outlet temperature is at least 120° C., preferably 120–170° C., whereby excessively remaining edible acid, in particular, acetic acid, is removed by evaporation and pleasant fragrance is imparted to the egg components by the roasting effect achieved under the above spray-drying conditions, rendering the formed pickled egg powder extremely tasteful.

In the drying and powderization step, e.g., at the spray-drying stage, the pickled egg solution or the liquid whole egg decomposition product desirably has a pH value within the range of 5–8, in particular, 5.5–7. Where the pH value deviates from this range, it is desirable to bring it into the above-specified range, using an edible acid or alkali.

A more calcium-rich pickled egg powder can be obtained by adding such a calcium source, for example, as egg shell powder, calcium carbonate, calcium acetate or calcium lactate at an optional stage of the processes of this invention, in particular, the pickling and dissolution treatment of whole eggs in aqueous solution of edible acid or at the initial stage of the decomposition treatment with hydrolytic enzyme or before the drying step, to the solution or decomposition liquid of whole eggs. Generally adequate use rate of such a calcium source is, 1–10 g, in particular, 1–5 g, as calcium per 100 g of starting eggs.

Furthermore, it is possible and preferred to blend suitable excipient or additives in the occasion of spray-drying above pickled egg solution or drying and powderization of the liquid decomposition product. Examples of useful excipient or additives include, gelatin, collagen, casein, egg white albumin, gum arabic, tragacanth, starch, dextrin, sodium alginate, lactose, glucose, amylolysis product, skim milk powder, whole milk, soybean protein, soybean milk, vegetable oils and fats (cacao butter, coconut butter, etc.), animal oil (fish oil, etc.), vegetable extract, methylcellulose and carboxymethylcellulose. Also at least one of these materials serviceable as excipient may be used as a coating agent to coat the dry powder. The coating renders the pickled egg powder slow-releasing, to alleviate stimulation on mucous membrane of the mouth and still improves the taste. Furthermore, vitamins such as carotene, vitamin $B_1$, vitamin $B_2$, vitamin $B_6$, vitamin $B_{12}$, vitamin C, vitamin D, vitamin E, vitamin $K_1$, vitamin $K_2$, niacin and the like may be blended.

Besides the excipients, an emulsifying agent such as sucrose ester of acetic acid, glycerin ester of fatty acid, soybean lecithin, sorbitan ester of fatty acid and the like may also be blended.

The pickled egg powder which is obtained according to the above-described first embodiment of the present invention is free from the smell of residual edible acid, in particular, that of acetic acid, has pleasant aroma as it is adequately roasted, is very tasteful and excels in eatability and drinkability.

Again, in the solubilized whole egg components-containing powder which is obtained with the use of hydrolytic enzyme according to the second embodiment of the present invention, the egg shell calcium is made water-soluble, proteins in egg white and yolk are reduced in molecular weight and lipid as well as glucide also are decomposed, and in consequence their bioabsorbability is markedly improved. The powder furthermore richly contain various minerals, vitamins, saccharides, enzymes, amino acids and organic acids and excels in eatability and drinkability.

Thus the pickled egg powders provided by the processes of the present invention are highly useful as synthetic nourishment supply and nutritious foodstuff.

The pickled egg powder provided by the present invention can be processed into finished product upon addition of food additives such as flavering agents for foods, sweeteners, natural food colors and the like as necessity arises, and may be given a desired form such as powder, granule, flakes, capsules and the like. It can also be given a solid form by kneading with, or being dissolved in, for example, cooking oil (animal and vegetable oils), cacao butter, palm oil, white chocolate and the like and shaping. It can also be served as drinks and other drinkable formulations. It can furthermore be advantageously utilized as food-enriching additives.

Hereafter the processes of the present invention are explained more specifically, referring to working examples.

EXAMPLE 1

To 1 kg of hen's whole eggs, 2 liters of brewed vinegar was added and let stand for 5 days at room temperature. As the egg shell was dissolved, the pickled egg solution was ground and filtered through filter cloth. The filtrate was spray-dried at an inlet temperature of 200° C. and outlet temperature of 125° C., to provide 380 g of pickled egg powder substantially free of vinegary smell but having favorable fragrance of roasted egg.

EXAMPLE 2

To 1.1 kg of hen's whole eggs, 2.5 liters of 5% aqueous acetic acid solution was added, and further 0.05% by weight of Saccharated Pepsin (Mikuni Chemical Industries Co., Ltd.) and 0.05% by weight of Newlase (Amano Pharmaceutical Co., Ltd.), both based on the egg weight, were added, followed by 4 days' standing at room temperature. Thereafter the liquid decomposition product was stirred thoroughly with a mixer, followed by another day's standing. The liquid was then filtered, and the filtrate was sterilized at 80° C. for 10 minutes and spray-dried at an inlet temperature of 210° C. and outlet temperature of 130° C. Thus 410 g of a solubilized pickled egg powder was obtained.

EXAMPLE 3

To 1 kg of quail's whole eggs, 2.5 liters of brewed vinegar was added, and also 0.1% by weight of Saccharated Pepsin (Mikuni Chemical Industries Co., Ltd.) and 0.05% by weight of Kreistase (Daiwa Chemical Co., Ltd.), both based on the whole eggs' weight, were added, followed by 2 days' standing at room temperature. Upon dissolution of the egg shell, the solution was ground and filtered through filter cloth and the filtrate was concentrated to ½ of the original volume under reduced pressure. To thus concentrated filtrate 100 g of lactose and 200 g of skim milk were added. The resulting solution was spray-dried at an inlet temperature of 190° C. and outlet temperature of 120° C. to provide 700 g of a solubilized pickled quail egg powder.

EXAMPLE 4

To 1.1 kg of hen's whole eggs, 2.5 liters of 5% aqueous acetic acid solution was added, and further 0.05% by weight of Saccharated Pepsin (Mikuni Chemical Industries Co., Ltd.) and 0.05% by weight of Newlase (Amano Pharmaceutical Co., Ltd.), both based on the weight of whole eggs, were added, followed by 4 days' standing at room temperature. The liquid decomposition product was thoroughly stirred with a mixer, allowed to stand for one further day and filtered. The filtrate was sterilized for 10 minutes at 80° C. and then spray-dried at an inlet temperature of 190° C. and outlet temperature of 110° C., to provide 430 g of a solubilized pickled egg powder.

EXAMPLE 5

To 1.1 kg of hen's whole eggs, 2 liters of brewed vinegar to which 3 g each of citric acid and malic acid had been added was added and mixed with a mixer. Then 0.05% by weight of Lipase (Amano Pharmaceutical Co., Ltd.) and 0.05% by weight of Pancreatin (Amano Pharmaceutical Co., Ltd.), both based on the weight of the whole eggs, were added, followed by 2 days' standing. Solid components were removed, and the remaining liquid decomposition product was low temperature-concentrated under reduced pressure to ½ of the original volume. The concentrate was spray-dried at an inlet temperature of 190° C. and outlet temperature of 115° C., to provide 380 g of a solubilized pickled egg powder.

EXAMPLE 6

To 1.1 kg of hen's whole eggs, 2.5 liters of brewed vinegar was added and mixed with a mixer. To the mixture 0.05% by weight of Kreistase (Daiwa Chemical Co., Ltd.) to the whole eggs was added as an enzymatic agent, followed by 24 hours' digestion at 35° C. After removing the solid components, the remaining liquid was spray-dried as it was, at an inlet temperature of 190° C. and outlet temperature of 115° C., to provide 400 g of a solubilized pickled egg powder.

EXAMPLE 7

To 1.1 kg of hen's whole eggs, a solution formed of 3 liters of brewed vinegar and 3 g each of citric acid and malic acid was added and mixed with a mixer. Then 0.05% by weight each of Saccharated Pepsin (Mikuni Chemical Industries Co., Ltd.), Lipase (Amano Pharmaceutical Co., Ltd.) and Pancreatin (Amano Pharmaceutical Co., Ltd.) to the whole eggs were added to the mixture, followed by 2 days' standing. After removing the solid components, the remaining liquid decomposition product was low temperature-concentrated under reduced pressure to ½ of its original volume. Into this concentrate an aqueous solution containing 15 g of gelatin was added, and the resulting solution was spray-dried at an inlet temperature of 200° C. and outlet temperature of 125° C., to provide 610 g of gelatin- and alginic acid-coated solubilized pickled egg powder.

EXAMPLE 8

To 1.1 kg of hen's whole eggs, 3 liters of brewed vinegar, 100 g of a 1:1 by weight mixture of egg shell and calcium carbonate, and 0.5% by weight to the whole eggs of Kreistase (Daiwa Chemical Co., Ltd.) as an enzymatic agent were added by the order stated, followed by 24 hours' digestion at 35° C. After removing solid components from the liquid decomposition product, 200 g of dextrin, 50 g of collagen and 100 g of lactose were added. The resulting solution was spray-dried at an inlet temperature of 210° C. and outlet temperature of 130° C. to provide 950 g of a solubilized pickled egg powder.

EXAMPLE 9

To 1.1 kg of hen's whole eggs, 2.5 liters of brewed vinegar was added, followed by 4 days' pickling to dissolve the egg shell. Then 0.02% by weight of Biodiastase (Amano Pharmaceutical Co., Ltd.), 0.02% by weight of Saccharated Pepsin (Mikuni Chemical Industries Co., Ltd.), and 0.01% by weight of Pancreatin (Amano Pharmaceutical Co., Ltd.), all based on the weight of the whole eggs, were added to the solution, followed by 24 hours' digestion at 30° C. After the digestion solid components were removed and the remaining liquid was concentrated. To the concentrate 300 g of dextrin and 200 g of lactose were added and together spray-dried at an inlet temperature of 200° C. and outlet temperature of 130° C., to provide 980 g of a solubilized pickled egg powder.

EXAMPLE 10

One-hundred (100) g of the pickled egg powder as obtained in Example 1 or 4 was mixed with 50 g of lactose and 50 g of dextrin. Each of the mixtures was granulated to provide 200 g of a stable and tasteful, novel pickled egg food.

EXAMPLE 11

Twenty (20) g of the pickled egg powder as obtained in Example 9 was mixed with 50 g of olive oil and 2.5 g of beeswax serving as a dispersant, and the mixture was filled in soft capsules at a rate of 300 mg per capsule in the accepted manner to provide an encapsulated food.

EXAMPLE 12

The pickled egg powder as obtained in Example 5 was added to starting materials for bread (strong flour: 150 g, granulated sugar: 10 g, yeast: 1.7 g, table salt: 25 g, water: 125 g and butter: 10 g) in an amount of 10% to the starting materials, and bread was baked according to the ordinary recipe and method for bread baking. A high quality, pickled egg-containing bread having the characteristic fragrance was obtained.

EXAMPLE 13

To a starting material for a cream for cake formed of 45 g of edible fat, 4 g of skim milk and 1 g of soybean lecithin, 5 g of the pickled egg powder as obtained in Example 1 and 40 g of water were added to form an emulsion. The emulsion was homogenized with a high pressure homogenizer at a pressure of 120 kg/cm$^2$ and sterilized at 90° C. for 15 seconds to provide a cream for cake.

EXAMPLE 14

To a starting material for ice cream composed of 7 g of saltless butter, 5 g of skim milk, 10 g of fatless condensed milk, 10 g of fresh cream, 7 g of cane sugar, 0.3 g of CMC and 55.7 g of water, 3 g of the pickled egg powder as obtained in Example 6 was added. The mixture was processed into a pickled egg-containing ice cream, according to ordinary ice cream-making procedures.

Comparative Example 1

Intestinal calcium absorbability was tested as to the pickled eggs as obtained in Examples 1 and 6 according to the present invention (which are labelled as Product 1 and Product 2 of the present invention, respectively) and micro-powder (Control product 1) obtained by micro-pulverizing shell alone of hen's eggs with a micro-pulverization mill.

Fifteen (15) mg each of the samples was dissolved in 15 ml of isotonic sodium chloride solution and poured into a tubed rat intestine (about 20 cm). The intestine tube was immersed in isotonic sodium chloride solution and incubated at 37° C. The intestinal absorbability was determined by measuring the calcium ($Ca^{2+}$) which migrated from inside the intestine tube to the outside isotonic sodium chloride solution. The results were as in Table 1 below:

TABLE 1

Comparison of Intestinal Absorbability of Calcium

| | Migrated Calcium ($\mu g$) | |
| --- | --- | --- |
| | in 20 minutes | in 40 minutes |
| Product 1 | 1050 | 2200 |
| Product 2 | 1100 | 2550 |
| Control product 1 | 150 | 230 |

From the results as shown in table 1, it can be understood that both the absorption rate and amount of the calcium absorbed through the intestinal wall from the products of this invention are markedly higher than those of the control product, although the starting hen's egg shell as the calcium source is identical.

What is claimed is:

1. A process for making pickled egg powder which comprises (i) combining an aqueous solution of edible acid and hydrolytic enzyme with whole eggs, including egg shell, (ii) subjecting the mixture from step (i) to a decomposition treatment at a temperature of from about 0° to about 50° C., and thereafter (iii) powderizing the product of step (ii) by drying.

2. The process according to claim 1, wherein step (iii) comprises spray-drying tile product from step (ii).

3. The process according to claim 2, wherein the spray-drying is carried out at an inlet temperature of at least 180° C. and an outlet temperature of at least 120° C.

4. The process according to claim 2, wherein the spray-drying is carried out at an inlet temperature in the range of 190° to 230° C. and an inlet temperature in the range of 120° to 170° C.

5. A process for making pickled egg powder which comprises (i) first combining an aqueous solution of edible acid to whole eggs including the egg shell to initiate decomposition treatment thereof, (ii) grinding the partially decomposed whole eggs from step (i) to form a ground emulsion, (iii) adding hydrolytic enzyme to the emulsion from step (ii) to further effect the decomposition treatment, and (iv) powderizing the product from step (iii) by drying.

6. A process according to claim 1, which further comprises, prior to step (i), grinding said whole eggs to form a ground emulsion of whole eggs, wherein step (i) comprises adding an aqueous solution of edible acid and hydrolytic enzyme to the ground emulsion, and step (iii) comprises spray-drying the decomposition product to form said powder.

7. The process according to claim 1, in which the aqueous solution of edible acid is selected from the group consisting of rice vinegar, natural rice vinegar, applea vinegar, aqueous acetic acid, aqueous malic acid, aqueous citric acid, aqueous succinic acid, aqueous lactic, acid and mixtures thereof.

8. The process according to claim 1, in which the hydrolytic enzyme is a hydrolytic enzymatic agent capable of hydrolyzing protein, fat and carbohydrate.

9. The process according to claim 1, further comprising adding a calcium source selected from the group consisting of egg shell powder, calcium carbonate, calcium acetate and calcium lactate, in an amount of 1–10 g as calcium, per 100 g of the whole eggs.

10. The process according to claim 1 or claim 5 or claim 6, which further comprises coating the pickled egg powder with an edible coating agent.

11. An edible foodstuff blended with a pickled egg powder obtained by the process according to claim 1 or claim 5 or claim 6.

12. A pickled egg powder produced by the method of any one of claims 1, 2, 5, 6 or 8.

13. A pickled egg powder produced by the method of claim 9.

14. A pickled egg powder produced by the method of claim 10.

15. The process according to claim 1 or claim 6, further comprising, heat-sterilizing the product of step (ii).

16. The process according to claim 1 or claim 6, further comprising filtering the product of step (ii).

17. The process according to claim 1 or claim 6, further comprising heat-sterilizing and filtering the product of step (ii).

18. The process according to claim 1, wherein the decomposition treatment in step (ii) is carried out at room temperature and under atmospheric pressure.

19. The process according to claim 1, wherein the decomposition treatment in step (ii) is carried out for 1 to 3 days.

20. The process according to claim 7, wherein the amount of the edible acid is from 150 to 500 ml, per 100 grams of whole eggs.

21. The process according to claim 1, wherein the amount of the hydrolytic enzyme is from about 0.01 to 1 gram, per 100 grams of whole eggs.

22. The process according to claim 1, wherein in step (iii) the product of step (ii) has a pH in the range of from 5 to 8.

23. A blended drink, comprising a blend of a drink and a pickled egg powder obtained by the process according to claim 1, or claim 5 or claim 6.

* * * * *